United States Patent [19]

Rayner

[11] Patent Number: 5,388,197
[45] Date of Patent: Feb. 7, 1995

[54] VIDEO EDITING SYSTEM OPERATOR INTER-FACE FOR VISUALIZATION AND INTERACTIVE CONTROL OF VIDEO MATERIAL

[75] Inventor: Bruce L. Rayner, Nevada City, Calif.

[73] Assignee: The Grass Valley Group, Inc., Nevada City, Calif.

[21] Appl. No.: 219,760

[22] Filed: Mar. 29, 1994

Related U.S. Application Data

[63] Continuation of Ser. No. 739,357, Aug. 2, 1991, abandoned.

[51] Int. Cl.$^6$ ............................................. G06F 15/62
[52] U.S. Cl. .................................... 395/154; 395/159; 395/161
[58] Field of Search .................. 395/155–161, 395/154; 360/73.08, 14.1; 358/113, 133, 138; 345/129, 131°

[56] References Cited

U.S. PATENT DOCUMENTS

| | | | |
|---|---|---|---|
| 3,798,366 | 3/1974 | Hunt et al. | 358/113 |
| 3,843,837 | 10/1974 | Hopkins, Jr. et al. | 358/138 |
| 4,204,227 | 5/1980 | Gurley | 358/138 |
| 4,402,012 | 8/1983 | Knight | 358/138 X |
| 4,639,783 | 1/1987 | Fling | 358/138 X |
| 4,866,542 | 9/1989 | Shimada et al. | 360/73.08 |
| 4,937,685 | 6/1990 | Barker et al. | 360/14.1 |
| 4,988,982 | 1/1991 | Rayner et al. | 340/706 |
| 5,039,937 | 8/1991 | Mandt et al. | 340/723 |
| 5,093,907 | 3/1992 | Hwong | 395/152 |
| 5,109,482 | 4/1992 | Bohrman | 395/154 |
| 5,148,154 | 9/1992 | Mackey et al. | 340/712 |
| 5,202,961 | 4/1993 | Mills et al. | 395/159 |
| 5,204,969 | 4/1993 | Capps et al. | 395/161 X |
| 5,237,648 | 8/1993 | Mills et al. | 395/133 |
| 5,283,864 | 2/1994 | Knowlton | 395/158 |

FOREIGN PATENT DOCUMENTS

| | | | |
|---|---|---|---|
| 0113993 | 7/1984 | European Pat. Off. | G11B 27/02 |
| 0268270 | 5/1988 | European Pat. Off. | G11B 27/02 |
| 0390048 | 10/1990 | European Pat. Off. | G11B 27/00 |
| 0438299 | 7/1991 | European Pat. Off. | G11B 27/034 |
| 2630572 | 10/1989 | France | G11B 27/02 |
| 2235815 | 3/1991 | United Kingdom | G11B 27/028 |

OTHER PUBLICATIONS

Tonomura et al, "Content Oriented Visual Interface Using Video Icons for Visual Database Systems", IEEE Visual Languages, Oct. 1989, pp. 68–73.

Selker et al, "Elements of Visual Language", IEEE Visual Languages, 1988, pp. 38–44.

Microsoft Works User's Guide, Microsoft Corp., 1989, pp. 103–173.

(List continued on next page.)

*Primary Examiner*—Mark R. Powell
*Assistant Examiner*—John E. Breene
*Attorney, Agent, or Firm*—John Smith-Hill; Francis I. Gray

[57] ABSTRACT

An operator interface for a video editing system provides a visual sense of the content of video sequences, as well as their length, while also providing enhanced interactive control of locations and time alignments of the video. As the video sequence is processed into the system, a small but representative sample of each frame is saved in a local memory, while the video itself is stored in mass storage. These samples are used to provide a video pictorial timeline of the underlying stored video. The location of an operator's view into the video sequence is controlled by a cursor's movement along a detailed video pictorial timeline, a reverse motion area and a forward motion area to provide VTR control for location changes on the video tape. The cursor's movement can be controlled by a mouse or a knob. Icons, either static or dynamic, are produced within the motion areas to indicate the amount of selected velocity. Timelines can be marked with time marks, roughly aligned and then automatically fine aligned by the system according to their respective time markers. The editing results associated with these timelines are also time aligned as a result of this process.

10 Claims, 13 Drawing Sheets

OTHER PUBLICATIONS

Murie, "Media Maker Makes Mac Move", Mar. 26, 1991, MacWeek, 53, 54, 58, illustrations, full text.

"Video Production Arrives on Desktop: A MacWorld Preview", The Seybold Report on Desktop Publishing, Aug. 13, 1990, p. 31 (2).

Guglielmo, "MacroMind and Farallon Ready Multimedia Tools", MacWeek, Feb. 12, 1990, p. 1(2).

Rosenthal, "Will Picons, Micons, or Dicons Supersede Icons?", MacWeek, Sep. 26, 1989, p. 32(1).

German publication entitled "Multimedia-Computer und die Zukunft des Film/Videoschnitts" by Peter Krieg from Fernseh Und Kino Technik, vol. 45 No. 5, 1991, Heidelberg, Germany, pp. 252–254, 256 & 258.

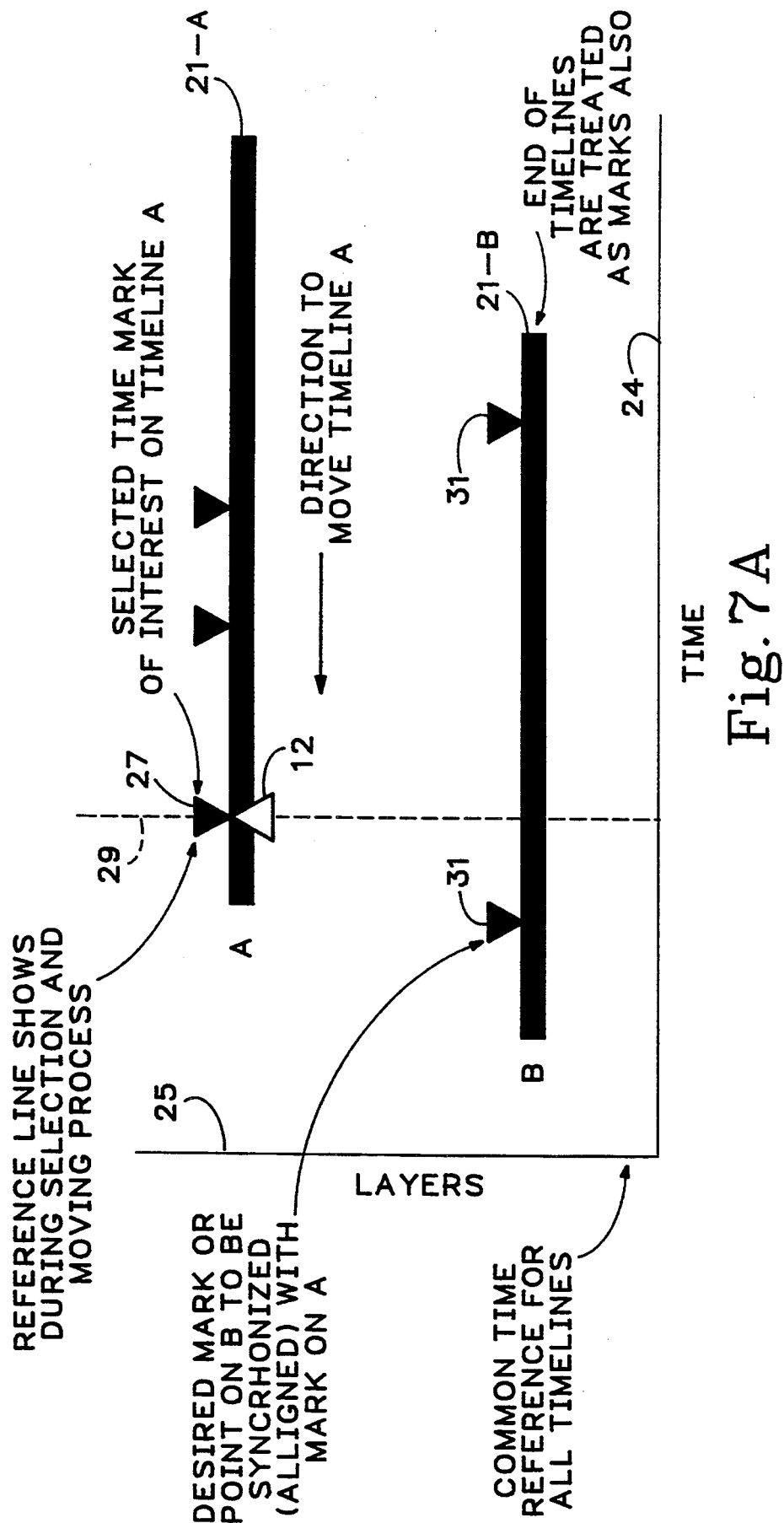

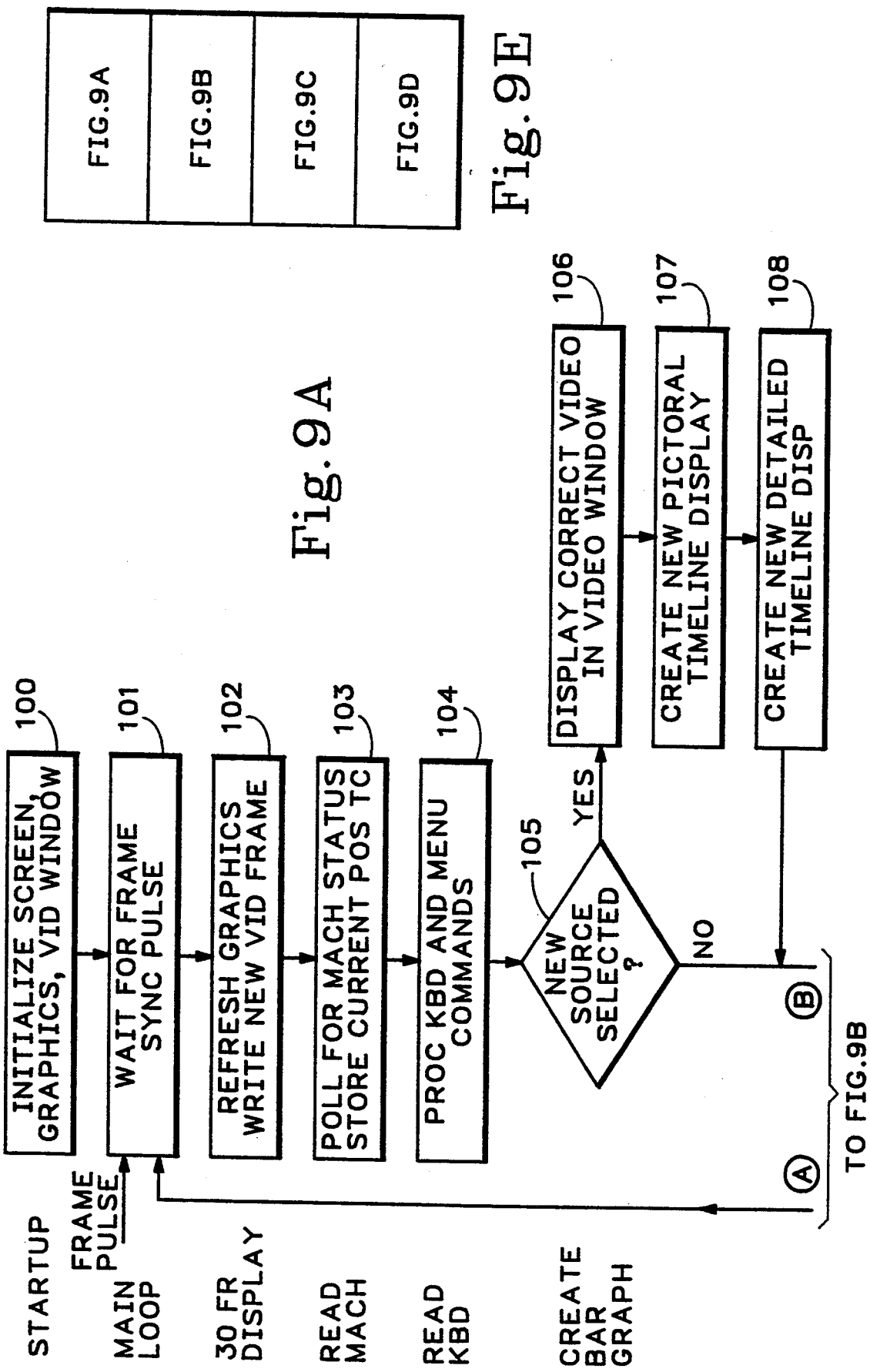

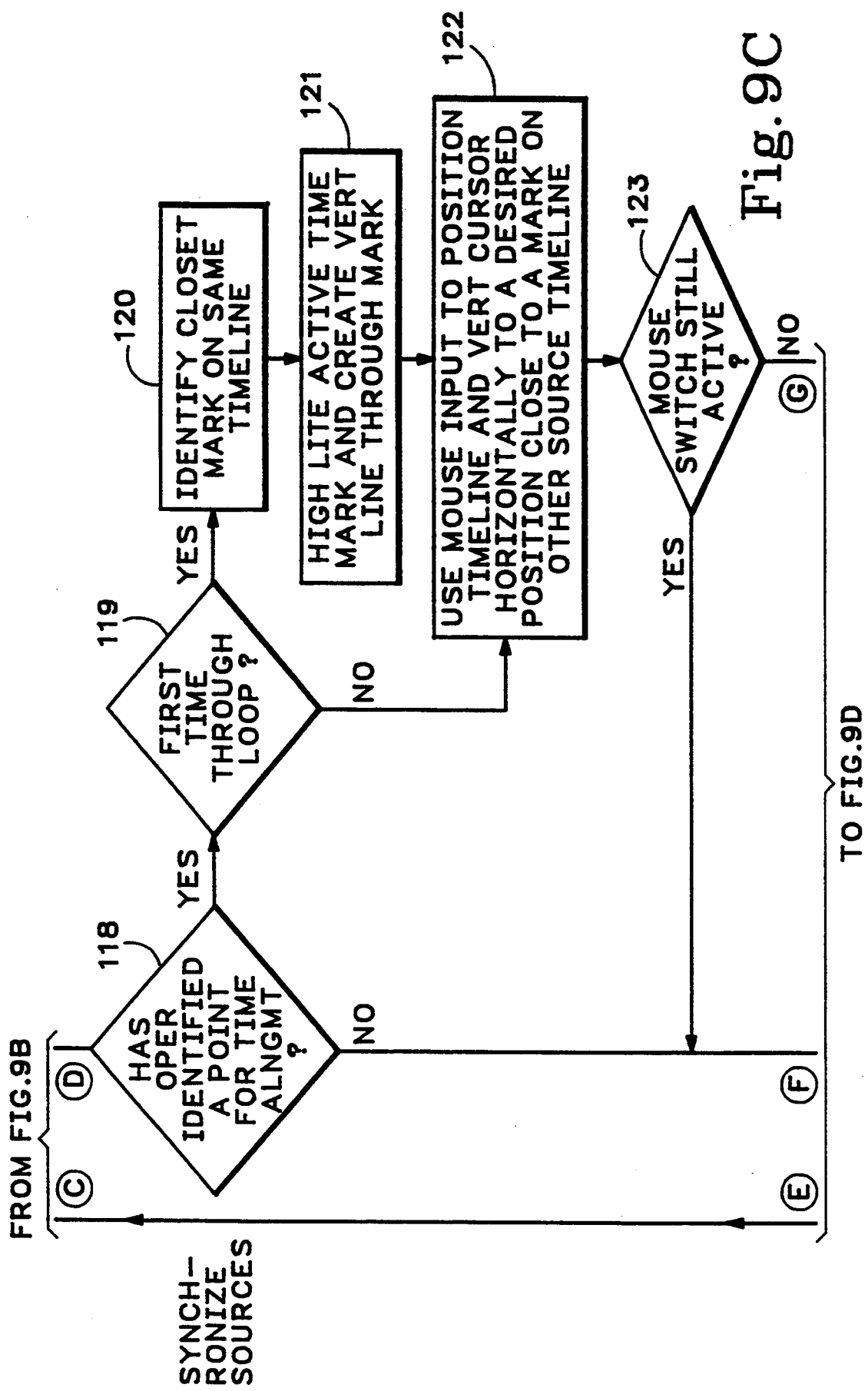

5,388,197

VIDEO EDITING SYSTEM OPERATOR INTER-FACE FOR VISUALIZATION AND INTERACTIVE CONTROL OF VIDEO MATERIAL

This is a continuation of application Ser. No. 07/739,357 filed Aug. 2, 1991 and now abandoned.

BACKGROUND OF THE INVENTION

This invention relates to video editing, and more particularly to an operator interface for a video editing system that provides enhanced visualization and interactive control of video sequences during the editing process.

Presently, the video editing equipment that is used tends to interpose a lot of numbers and technical considerations between an artist attempting to create a video program and the video images that must be manipulated in the course of creating that program. Cutting and splicing film on a film editor provided a visual and spatial dimension to the temporal aspect of a film. Thus far, efforts to bring this same sort of interactive convenience and "feel" to the video tape editing process have met with limited success, although considerable progress has been made.

U.S. Pat. No. 4,937,685 to Barker et al for a "Method of Display Presentation for Video Editing" discloses an apparatus and method for video composition that presents an operator with video labels at each end of each video clip. Video labels are low resolution digital representations of a frame of actual video. Because these video labels contain much less total information than the underlying video frame that they represent, they can be more readily stored and retrieved than actual video images can be, and are therefore used as surrogates for the real video images during some parts of the editing process.

In the system described in the Barker et al '685 patent, the operator can view a clip of video or a transition between two clips of video on a main monitor in an "endless loop" repeating display. A set of four label display screens show the above described video labels of the clips currently under active manipulation. A plurality of additional smaller display monitors are provided in vertical pairs for viewing a series of pairs of video labels representing a series of clips currently arranged to be viewed in sequence.

In the Barker et al '685 system, the operator is able to manipulate the video labels instead of the video itself, thereby permitting the re-arrangement of the video clips virtually, even though the actual video is still stored in its original order, thus minimizing the need for fast access to the video itself. When rapid access to the actual video is required, it is achieved by recording multiple copies of the same video clip on multiple video tape recorders (VTRs) and positioning each of the VTRs at different locations on the clip, so that one VTR is always close to any desired point of interest.

While the Barker et al '685 system provides the operator with video labels at the beginning and end of clips, a sequential continuous loop display of the active clip and a readout of the duration of the active clip, it does not provide any graphic display of the clip's length or the rest of its internal contents.

A video editing software system called "Media Maker" is produced by Macromind Inc., 410 Townsend St., Suite 408, San Francisco, Calif. This system displays simple timelines that indicate the length of video sequences as they are being manipulated, but these simple timelines do not provide any visual cues as to the contents of the video sequences.

In connection with another aspect of the prior art, control of the displayed location on a video tape in a video tape recorder has traditionally been accomplished with two rotatable wheels or knobs or a single one which operates in two modes, depending on the position of a mode control switch. In the first mode of operation, rotational motion of the wheel or knob is interpreted as positional distance. In the second mode of operation, the same rotational motion is interpreted as velocity magnitude control. U.S. Pat. No. 4,988,982 to the present inventor for "Touch Pad Machine Control", hereby incorporated by reference, describes this prior art in its "Background of the Invention". The specification of the U.S. Pat. No. 4,988,982 describes an alternative approach to VTR control that relies on a touch pad with different regions, one of which is devoted to position control, another of which is devoted to velocity control.

SUMMARY OF THE INVENTION

It is an object of the present invention to provide an operator interface for a video editing system that displays a graphic representation of a video sequence to give the operator a visual sense of the content of the sequence, as well as its length.

According to one aspect of the invention, as the video sequence is first processed into the system, a small but representative sample of each video frame is saved in a local memory, while the video itself is stored in mass storage. The frame samples are used in the display to provide a video pictorial timeline of the underlying stored video.

It is a further object of the present invention to provide an operator interface for a video editing system that allows interactive and efficient positioning within the video sequence.

According to another aspect of the invention, the location of an operator's view into the video sequence is controlled by a cursor in a machine control window. The machine control window contains a detailed video pictorial timeline, a reverse motion area and a forward motion area. The interaction of the cursor with the reverse motion area produces selected amounts of reverse velocity along the video sequence seen in the video pictorial timeline and on other parts of the screen. Similarly, the interaction of the cursor with the forward motion area produces selected amounts of forward velocity along the video sequence. Icons, which can either be static or dynamic, are produced within the motion areas to indicate the amount of selected velocity. The cursor can be controlled by either a mouse or a knob.

It is a further object of the present invention to provide a method of video tape recorder position and velocity control that makes such control easier and more intuitive for the operator.

According to another aspect of the invention, a single knob has three regions, one for tape position control and one each for forward and reverse tape velocity control. Rotational motion of the knob into the latter two regions produces velocity changes, with the current velocity being determined according to the following relationship:

$$V_{cur} = \frac{D_{cur}}{D_{max}} * V_{max}$$

where,
    $V_{cur}$ is the current velocity,
    $V_{max}$ is the maximum velocity,
    $D_{cur}$ is the current distance into the region, and
    $D_{max}$ is the maximum distance into the region.

It is another object of the present invention to provide an operator interface for a video editing system that automatically performs fine time alignment of two video sequences that have been marked and coarsely aligned by an operator.

According to another aspect of the invention, two or more timelines can be marked with time marks and the video editing system then automatically performs a fine time alignment of the timelines according to their respective time markers. When an editing session is completed, the results of that editing session reflect the time synchronization produced by this time alignment process.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIGS. 7A and 7B illustrate the process of marking and time-aligning two video sequences to achieve time alignment between them;

FIGS. 9A, 9B, 9C, 9D and 9E are a simplified logic flow diagram of a portion of the operator interface for a video editing system in accordance with the present invention.

DETAILED DESCRIPTION

Figure 1:
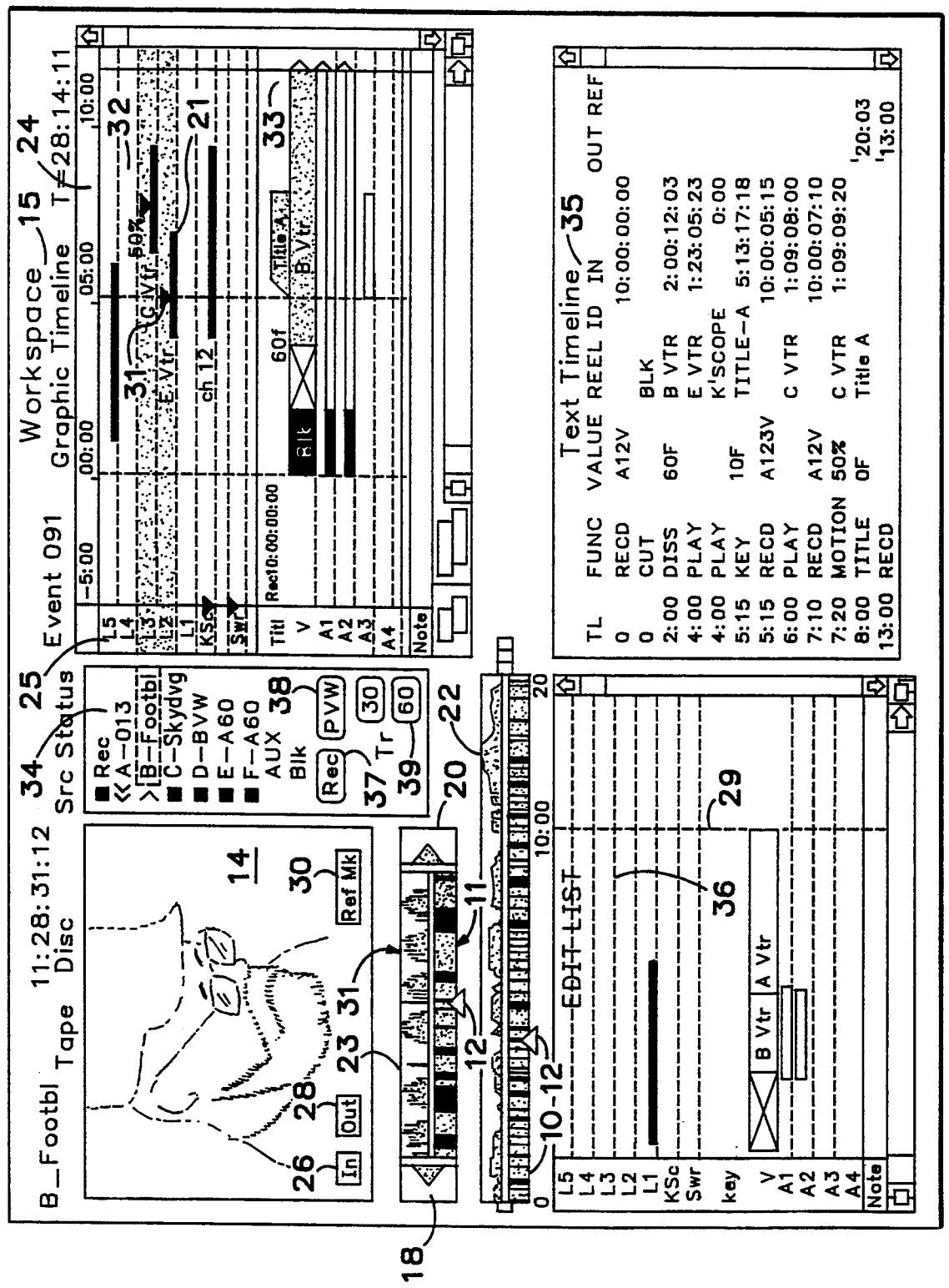
FIG. 1 is a screen view of a portion of the operator interface of the present invention.

The display shown in FIG. 1 is part of a user interface implemented on an Apple Macintosh computer. It utilizes window and cursor control approaches that are somewhat similar to the normal Macintosh (TM) interface, but instead of the normal Macintosh keyboard this system employs a keyboard that has colored keys. That keyboard resembles the keyboards and color codings that are somewhat standard in the television post-production editing equipment industry.

The screen shown in FIG. 1 is divided into four quadrants. The upper left quadrant contains most of the features associated with the present invention and will be discussed in detail below. The upper right quadrant is a Workspace 15 that has a vertical layers axis 25 along its left side and a horizontal time axis 24 along its top. The scale on horizontal time axis is variable, allowing the operator to select the time span that will be displayed.

The Workspace 15 shows, for a portion of a program being created, the sequential arrangement of video segments or clips, as well as the relative synchronization of those video clips (layers) that are to play at the same time. The Workspace 15 is divided into two parts, a background area 33 on the bottom and a layers area 32 on top. The background area 33 is used for basic editing that only involves a linear arrangement of video sequences with cuts or dissolves. The material that appears here may form the background for a more complex event that is organized into layers in the layers area 32. In the background area 33, video segments are shown in two ways: they either appear as a wide timeline, such as the one whose dark portion is labeled "Blk" and whose shaded portion is labeled "B Vtr", or as a title, such as the darker shaded timeline above the "B Vtr" timeline, the one with the sloping leading edge that represents a transition. Audio sources associated with the wide timeline appear as narrow timelines beneath it.

In the layers area 32, video segments are shown as simple, narrow timelines 21. Transitions or effects in the layers area 32 are shown as separate individual timelines. Layers in the Workspace 15 that are currently included in the edit are shown shaded, as layers L3 and L2 are, while layers that are not currently included in the edit are shown in white (unshaded), as layers L5 and L4 are.

The lower right quadrant of the screen shown in FIG. 1 contains a Text Timeline 35 that provides a textual display of the composite timeline being developed in the Workspace 15 areas 32 and 33. The lower left quadrant of the screen displays an Edit (Decision) List 36 (EDL) of editing previously performed. The Edit List 36 area can be scrolled to look at old versions of edits or at a partial result of the current editing process being performed in the Workspace 15 areas 32,33. As work is completed in the Workspace 15 areas 32,33, it is appended to the current Edit List 36 at the location of vertical reference line 29.

As can be seen in FIG. 1, the first ten seconds of an edit is shown in the Workspace 15 layers area 32, the background area 33 and the Text Timeline 35. At the left side of the Workspace 15, five seconds of pre-roll time for the switcher is shown. Following that, in the background area 33 and in the Text Timeline 35, two seconds of black background is shown. Audio 1 (A1) and Audio 2 (A2) are also black during this time, indicating a silence on the audio tracks associated with the black video. The interval of black video and silent audio is shown in the Text Timeline 35 as the second entry, "0 CUT BLK". The first entry in the Text Timeline 35 indicates that this recording (RECD) will use Audio 1, Audio 2 and Video (A12V), and that it will be appended to the Edit List 36 at time 10:00:00:00 in the Edit List 36 frame of reference.

The third entry in the Text Timeline 35 indicates that at time two seconds, 2:00, there will be a dissolve, DISS, lasting sixty frames, 60F, to the B VTR which is to start at time 2:00:12:03 in the B VTR frame of reference. This same information is shown in the background area 33 by the white box with the crossed lines as diagonals. Here the duration of the dissolve is shown with the notation "60ƒ".

The fourth entry in the Text Timeline 35 indicates that at time four seconds, 4:00, another source, E VTR, will PLAY starting at time 1:23:05:23 in the E VTR frame of reference. This same information is shown visually in the layers area 32 on layer L2.

The fifth entry in the Text Timeline 35 indicates that at time 4:00 the K'SCOPE (a Kaleidoscope special effects device) is to play. The same event is shown in the layers area 32 on the layer below layer L1, the layer labeled "KSc".

The sixth entry in the Text Timeline 35 indicates that at time 5:15 a TITLE-A will be KEYed in over an interval of 10 frames, 10F. This same information is presented in the background area 33 by the dark bar with the diagonal leading edge that is located above the timeline labeled "B Vtr". The diagonal edge indicates that the title dissolves in, with the length of the dissolve being represented by the length of the diagonal portion of the bar. At the same time as the title is keyed in, 5:15, a new audio source, A3, is shown entering the recording by the entry RECD A123V. At time 6:00 the C VTR is to start playing, and at time 7:20 its MOTION is changed to 50% of normal playing speed. At time 7:10 audio source A3 is seen to end with the entry RECD A12V.

Referring now to the left side of FIG. 1, two video pictorial timelines 10 and 11 according to the present invention are visible. A main video pictorial timeline 10 appears in the region that separates the upper left quadrant and the lower left quadrant. A more detailed video pictorial timeline 11 appears above the main video pictorial timeline, in the lower portion of the upper left quadrant. These video pictorial timelines provide the operator with a sense of the image presented by the video sequence. As will be further explained below, when a new video sequence is put into the video editing system of the present invention, a sample is taken of each frame. This sample is small, typically only eight pixels of information, but when these frame samples are assembled into a video pictorial timeline 10,11, this limited data provides enough information to visually cue the operator quite effectively.

The main video pictorial timeline 10 shown in FIG. 1 represents a video sequence that can vary in length from a few seconds to an hour and a half. The desired scaling factor is produced by duplicating or decimating the frame samples representing the video sequence so that a representative sample of the samples is displayed in the video pictorial timeline 10. Immediately above the main video pictorial timeline 10 there is an associated main audio level timeline 22. As the name suggests, the audio level timeline 22 illustrates the audio amplitude along the main video pictorial timeline 10 by displaying a single-sided "envelope" indicative of the amplitude level at each point in time.

In either of the video pictorial timelines 10,11 or the simple timelines 21 in the Workspace 15 areas 32,33, clips can be taken from a longer video sequence by clicking a control button on the mouse or other cursor control device while the cursor 12 is on the mark In box 26 to identify a starting point or the mark Out box 28 to identify an ending point. Reference marks 31 for performing time alignment between different pieces of video can be placed anywhere within a video sequence using the Ref Mk box 30 or a corresponding key on the keyboard (66 in FIG. 2).

Video window 14 displays the video image at the current location within any video sequence that is activated, including the composite video segments that are the result of an editing session. The video window 14 displays the scene at the location of cursor 12 along the video pictorial timeline 10, whether it is still or moving, at normal speed or higher speeds. Immediately to the right of the video window 14 is a source status display 34. Six VTRs, A through F, are listed as sources, with squares shown to the left of those that are stopped. Sources that are playing forward at normal speed, such as the B source, are indicated with a ">" pointing to the right. A ">>" indication signifies fast forward, while a "<<" indication to the left, as is shown for source A, indicates fast rewind. Below the list of sources there is a RECord box 37, a PreVieW box 38 and a palette of most used transitions 39. Clicking the control button on the mouse while the cursor 12 is positioned on the RECord box 37 causes the activity represented by all of the active layers in the layers area 32 and the background area 33 to be recorded into the recording medium. Clicking on the PreVieW box 38 causes a "virtual edit" of the active layers to be previewed as a composite sequence but not recorded, i.e., be made visible in the video window 14 as they would appear if recorded. Clicking on either the "30" (frames) box or the "60" (frames) box in the palette of most used transitions 39 allows the user to drag a transition of that length to the location of his or her choice in the Workspace 15 areas.

The content of the main video pictorial timeline 10 changes to reflect whichever video sequence has most recently been identified as the current active one by the operator clicking the control button on the mouse 70. The current active video sequence can be designated either by clicking on its source in the status area 34 or on its simple timeline 21 in the Workspace 15 areas 32 or 33 in the upper-right quadrant or by the use of keys on the keyboard. The main video pictorial timeline 10 can display active video sequences that are a single clip of video or, when the preview (PVW) box 38 is clicked on, the main video pictorial timeline 10 can display a composite sequence of video that has been virtually edited into a single sequence in one of the work areas 32 or 33, as was explained above.

The user's movable cursor 12 can be locked onto one of the cursors (also 12 in this Figure) that are permanently associated with the main video pictorial timeline 10 and the detailed video pictorial timeline 11 by moving the movable cursor over the associated cursor and clicking the control button once. The user's movable cursor can be unlocked from the cursor 12 associated with one of the video pictorial timelines 10,11 by clicking the control button twice.

While the user's movable cursor 12 is locked to one of the cursors associated with a video pictorial timeline 10 or 11, moving the cursor 12 causes one of two results, depending on whether the mass storage means (item 50 in FIG. 2) is linear, such as a conventional video tape recorder, or random access, such as laser discs or multiple hard discs. As will be further described with reference to FIG. 5, if the system's mass storage means 50 is linear, moving the cursor 12 faster than the linear storage means can move the video tape causes a second cursor (13 in FIG. 5) to appear. The second cursor 13 shows the actual VTR position on the tape, while the cursor 12 under the operator's control represents the desired tape position. When the cursor 12 slows down or stops, the other cursor, representing the actual position, moves to catch up with the desired position at the maximum speed of the linear storage means 50. If the system's mass storage means 50 is random access memory of some kind, no second cursor appears when the cursor is moved rapidly and the video window 14 reflects the cursor 12 position almost instantaneously.

If the user clicks the mouse 70 button while the cursor 12 is on the main pictorial timeline 10, but not on the cursor 12 associated with the main pictorial timeline 10, the cursor 12 associated with the main pictorial timeline 10 becomes a current position cursor 13 and the cursor 12 at the position determined by the mouse 70 becomes a desired position cursor 12. If the mass storage means 50 is random access, the current position cursor will almost instantaneously move to the desired position and the image at that location will be displayed in the video window 14. If the mass storage means 50 is linear, e.g., VTRs, the current position cursor 13 will move toward the position of the desired position cursor 12 at the maximum speed of the VTR and the images along the way will appear in the video window 14.

The more detailed video pictorial timeline 11 directly above the main video pictorial timeline 10 is part of a "machine control window". The other parts of the machine control window are the reverse motion area 18, the forward motion area 20 and the desired position cursor 12. The detailed video pictorial timeline 11 contains a four second interval of video, with each video frame sample shown two pixels wide for clarity. A machine control window audio level timeline 23 shows the amplitude of the audio associated with the video shown in the detailed video pictorial timeline 11. A time mark 31 seen above the machine control window audio level timeline 23 marks a particular location in the detailed video pictorial timeline 11 and its associated machine control window audio level timeline 23.

The machine control window permits the operator to scroll slowly through individual frames of the currently active video sequence, whether the storage is linear or random access (non-linear). It is used for fine control to identify and mark individual frames in the video sequence with time marks 31 for use in time aligning different video sequences. As the desired position cursor 12 is moved along the detailed video pictorial timeline 11, its motion is reflected in the content of the video window 14 and in the position of the cursor 12 associated with the main video pictorial timeline 10, although it should be noted that the motion of the latter may be nearly imperceptible, depending on the scale factor of the main video pictorial timeline 10 and how that relates to the view provided by the detailed video pictorial timeline 11 in terms of the ratio of their time scales.

To access a location that is beyond one of the ends of the detailed video pictorial timeline 11, the desired position cursor 12 is moved past that end. Moving beyond the ends of the detailed video pictorial timeline 11 causes the detailed video pictorial timeline 11 and its associated audio level timeline 23 to start moving in the opposite direction to bring the desired location into view.

If the movement of the desired position cursor 12 is into the reverse motion area 18 to the left of the video pictorial timeline 11, the video image in the video window goes into reverse motion as the scenes represented by the frame samples in the detailed video pictorial timeline 11 stream to the right. Conversely, if the movement of the desired position cursor 12 is into the forward motion area 20 to the right of the detailed video pictorial timeline 11, the image in the video window 14 fast forwards and the scenes represented by the frame samples in the detailed video pictorial timeline 11 stream to the left.

The speed of these forward and reverse motions depends on how far beyond the ends of the detailed video pictorial timeline 11 the movement takes the desired position cursor 12. When the desired position cursor 12 reaches the outside end of either of the motion areas 18,20, the physical tape speed is maximum in that direction. As the magnitude of this attempted movement increases, an indicator (to be further described in connection with FIG. 5) fills the forward motion area 20 or the reverse motion area 18 in proportion to how fast the video sequence is moving relative to its maximum speed. When this indicator fills the forward or reverse motion areas 20 or 18, the velocity of the video sequence movement is at its maximum value.

When the operator wants to slow down or stop the motion of the video sequence through the detailed video pictorial timeline 11, he uses the mouse to move the desired position cursor 12 back towards the detailed video pictorial timeline 11 portion of the machine control window display, thereby slowing the velocity of the video sequence motion. Completely returning the desired position cursor 12 to the detailed video pictorial timeline 11 stops the motion of video sequence entirely.

Figure 2:
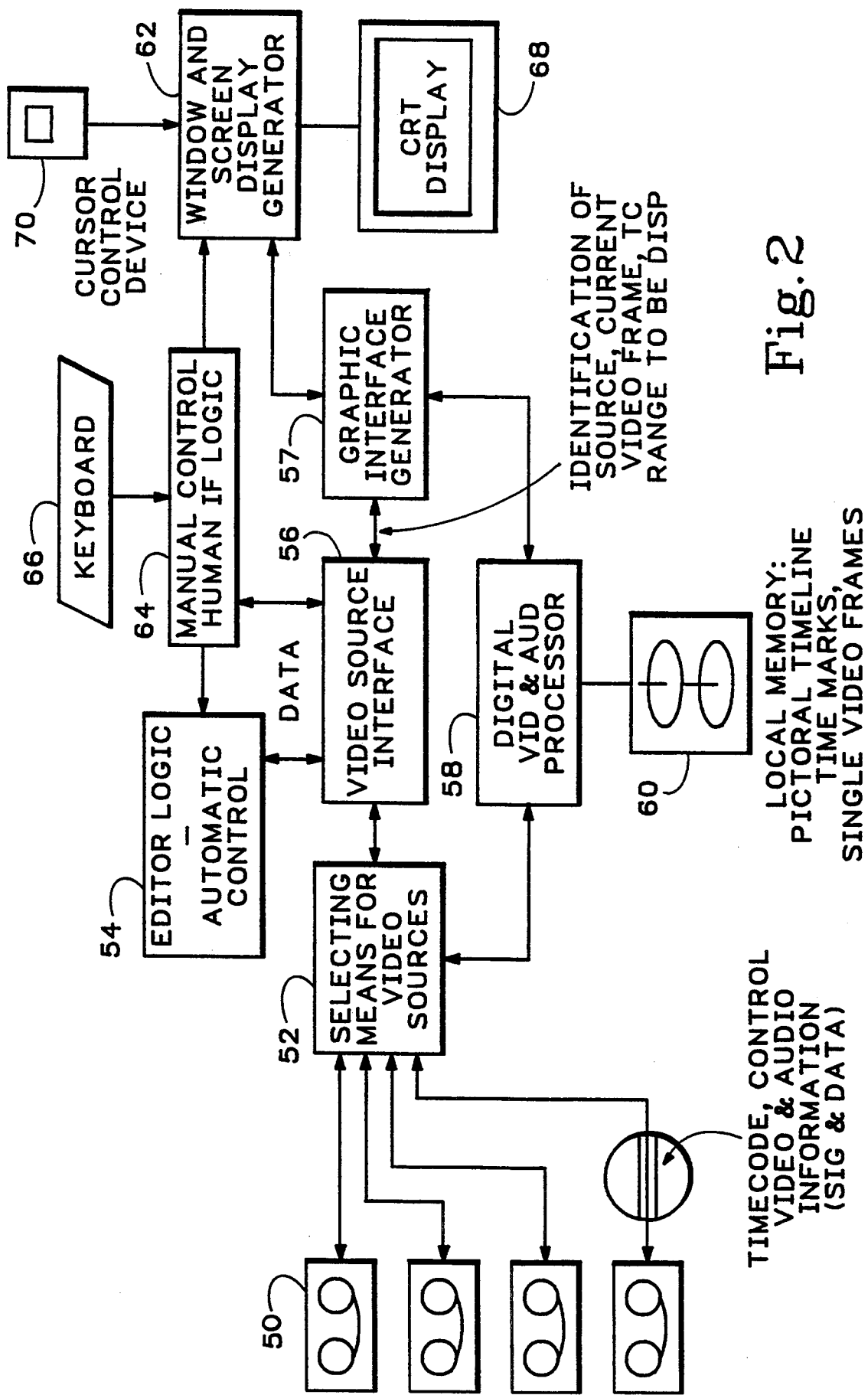
FIG. 2 is a simplified block diagram of the video editing system.
Figure 3:
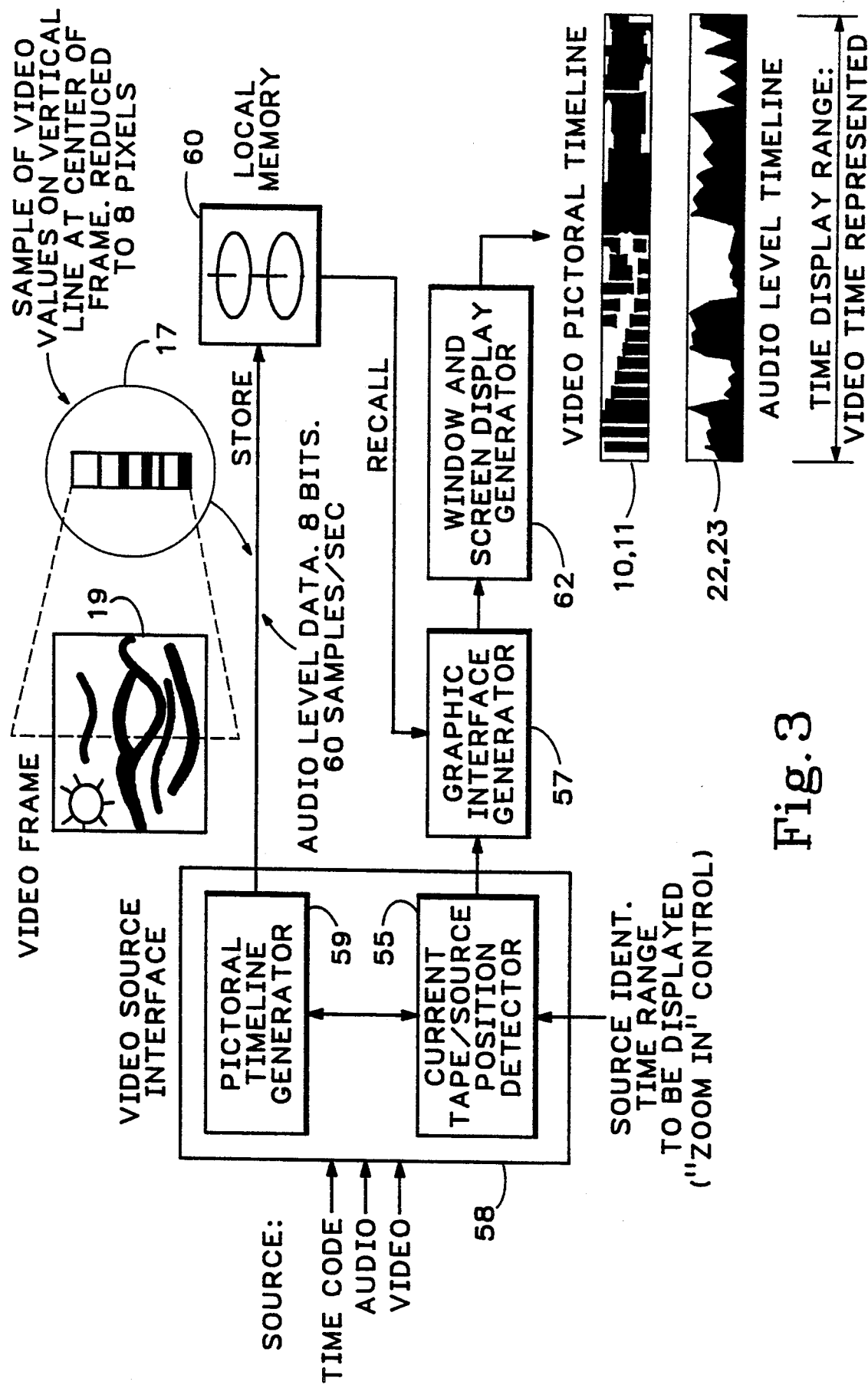
FIG. 3 is a block diagram representation of how a video pictorial timeline is created.

Referring now to FIGS. 2 and 3, the frame samples 17 that make up video pictorial timelines 10 and 11 are produced by a digital video and audio processor 58 and stored in a local memory 60 that is convenient to the graphic interface display generator 57. As will be further described below, time marks 31 and single video frames 19 are also stored in the local memory 60.

The underlying video frames 19 that the frame samples 17 represent are stored remotely in mass storage means 50. The video frame samples 17 are stored with pointers to the locations of the corresponding video frames 19. These pointers, depending on the nature of the mass storage means 50, are either the SMPTE time codes, or memory addresses or both. While the icons shown for the mass storage means 50 in FIG. 2 suggest VTRs, they in fact can be any other video storage means and are preferably high capacity random access memory, such as multiple laser discs or magnetic hard discs.

The artist or editor operator controls operation through a keyboard 66 and a mouse or other cursor control device 70 while interacting with the CRT display 68. Keyboard commands are processed by the human interface logic portion of block 64 which also contains manual controls. As will be further described below, most of the activity associated with the present invention occurs within the graphic interface display generator 57, the digital video and audio processor 58 and window and screen display generator 62. These interact with local memory 60, cursor control device 70 and the CRT display 68 to effect most of the behaviors associated with the invention.

Operator input from the keyboard interacts with manual control human interface logic 64 to produce desired effects in the editor logic and automatic control software 54. The video source interface 56 interacts with the editor logic and automatic control software 54 and the manual control human interface logic 64, receiving instructions from them and returning status information. Responsively to these instructions, the video source interface 56 controls access to the contents of the mass storage means 50 via selecting means for video sources 52. The selecting means for video sources 52 stores (and retrieves) timecode and control data and video and audio information in (and from) the mass storage means 50. The video source interface provides identification of the video source, the current video frame data and the timecode range to be displayed to the graphic interface display generator 57. The graphic interface display generator 57 controls the window and screen display generator 62 to produce the display on the CRT display 68.

Referring now to FIG. 3, the digital video and audio processor 58 produces a frame sample 17 for each video frame 19, and sends these frame samples to the local memory 60. In one embodiment, each frame sample 17 that is taken consists of eight individual pixels distributed vertically along the center of the video frame 19. In another embodiment, the frame sample 17 consists of eight composite pixels that each represent the average video values within eight different regions distributed vertically along the center of the video frame 19. In either case, these frame samples 17, when displayed in sequence as a video pictorial timeline, represent an "edge view" of the contents of the underlying video sequence.

Other methods of producing the frame samples 17 are envisioned. One of these requires considerably more processing, but provides the operator with an even more intuitive feel for the activity occurring within the video sequence being represented. This approach relies on an algorithm to identify the most dramatic features of the luminance and chrominance values found in a frame 19 and emphasize those in the edge view representation. Even when these frame samples 17 are the result of sophisticated processing and communicate more content to the viewer, they are very small in terms of the data required compared to the data content of the video frame 19 that they represent.

Audio recordings that are input to the system, whether or not they are directly associated with a video recording, are processed to produce audio envelopes 22,23 that provide a visual representation of the audio activity over time. The data required to reconstruct these audio envelopes is also stored in the local memory 60. Audio is sampled 60 times per second and stored as eight bits of data. The audio envelope data is also stored with pointers to where the underlying audio is stored in the mass storage means 50 (FIG. 2).

The video source interface 58 contains a pictorial timeline generator 59 and a current tape/source position detector 55. The video source interface 58 receives source identification and zoom control (time range to be displayed) input from the human interface logic 64 and timecode, video and audio information from the mass storage means 50 (both shown in FIG. 2). Based on the zoom control information, the pictorial timeline generator 59 determines how much the video frame sample record must be decimated for display. Changing the zoom control alters the dynamic range of the video pictorial timeline 10 from ninety minutes to a few seconds. It also correspondingly changes the detail that can be seen as a result of the video frame sample decimation that must occur to provide room for the longer times.

The current tape/source position detector supplies the graphic interface generator 57 and the pictorial timeline generator 59 with information about the current position on the video tape or other source. The pictorial timeline generator 59 controls which video pictorial timeline 10,11 and audio level timeline 22,23 data the local memory 60 is to supply to the graphic interface generator 57. Using the current tape/source position information provided by the current tape/source position detector 55 and the pictorial timeline data supplied from the local memory, the graphic interface generator 57 operates through the window and screen display generator 62 to create the video pictorial timelines 10 and 11 and the audio level timelines 22 and 23 on the CRT display 68 (FIG. 2).

Figure 4:
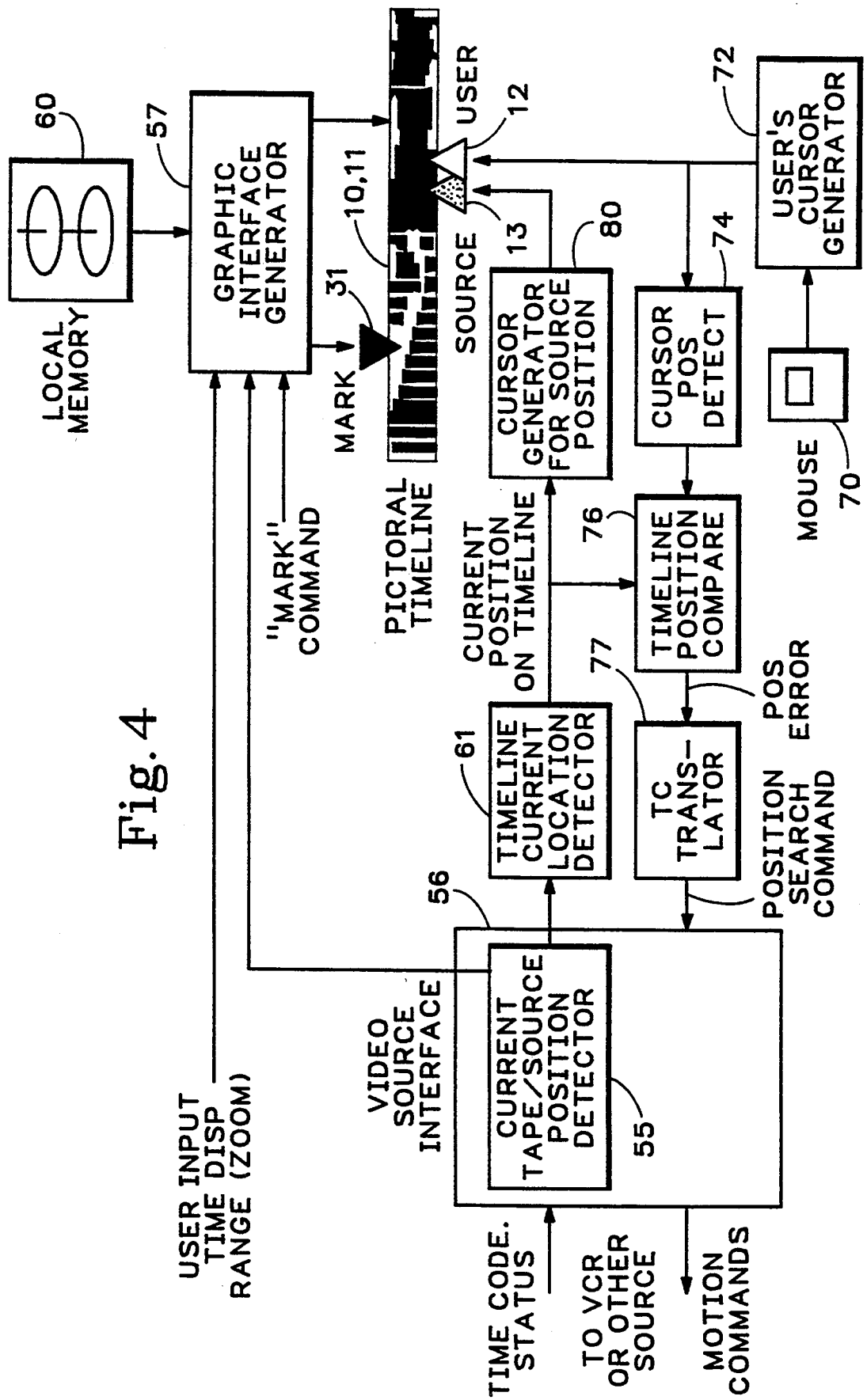
FIG. 4 is a block diagram representation of how time marks and cursors are generated.

FIG. 4 is a block diagram representation showing how cursors 12,13 and time marks 31 are produced and applied to the video pictorial timelines 10 or 11. As partially described above, one cursor 12 is controlled by the operator to indicate the desired position on the video sequence, while a second cursor 13 indicates the actual position of a video tape recorder or other linear mass storage means 50 on the video tape or other medium.

The operator controls cursor 12 via the mouse 70 or other cursor control device and the user's cursor generator 72. A cursor position detector 74 monitors the cursor 12 position and provides timeline position comparator 76 with the user's cursor 12 position. The timeline position comparator 76 also receives current position on the timeline information from the timeline current position location detector 61. By comparing these two inputs, the timeline position comparator 76 is able to generate position error information. A timecode translator 77 converts the position error information from the timeline position comparator 76, which is in the frame of reference of the CRT display (68, FIG. 2), into desired location changes in timecodes which are in the frame of reference of the stored video. These desired changes are then provided to the video source interface 56 which sends a corresponding motion command to the VTR or other source.

The video source interface 56 receives timecode and status information from the VTR or other source. This current source position information is detected by the current tape/source position detector 55 within the video source interface 56 which supplies it to the timeline current location detector 61 and to the graphic interface generator 57. The timeline current location detector 61 supplies current position on the timeline information to the timeline position comparator 76, as mentioned above, and to the cursor generator for source position 80. The cursor generator for source position 80 produces the current position cursor 13 on the CRT display 68 at the location indicated by the current position on timeline information.

In addition to the current source position information mentioned above, the graphic interface generator 57 also receives time display range (zoom) information and "Mark" command information from user input. When a mark command is received, the graphic interface generator 57 produces a time mark 31 at that location. This time mark 31 is stored in the local memory 60 along with the frame samples 17 that constitute the video pictorial timelines 10,11 so that future video pictorial timelines will include this time mark 31 at this location. The graphic interface generator will continue to generate a time mark 31 at the stored location until it receives a delete command (not shown) while the cursor position detector 74 is indicating the position of this old mark.

Figure 5:
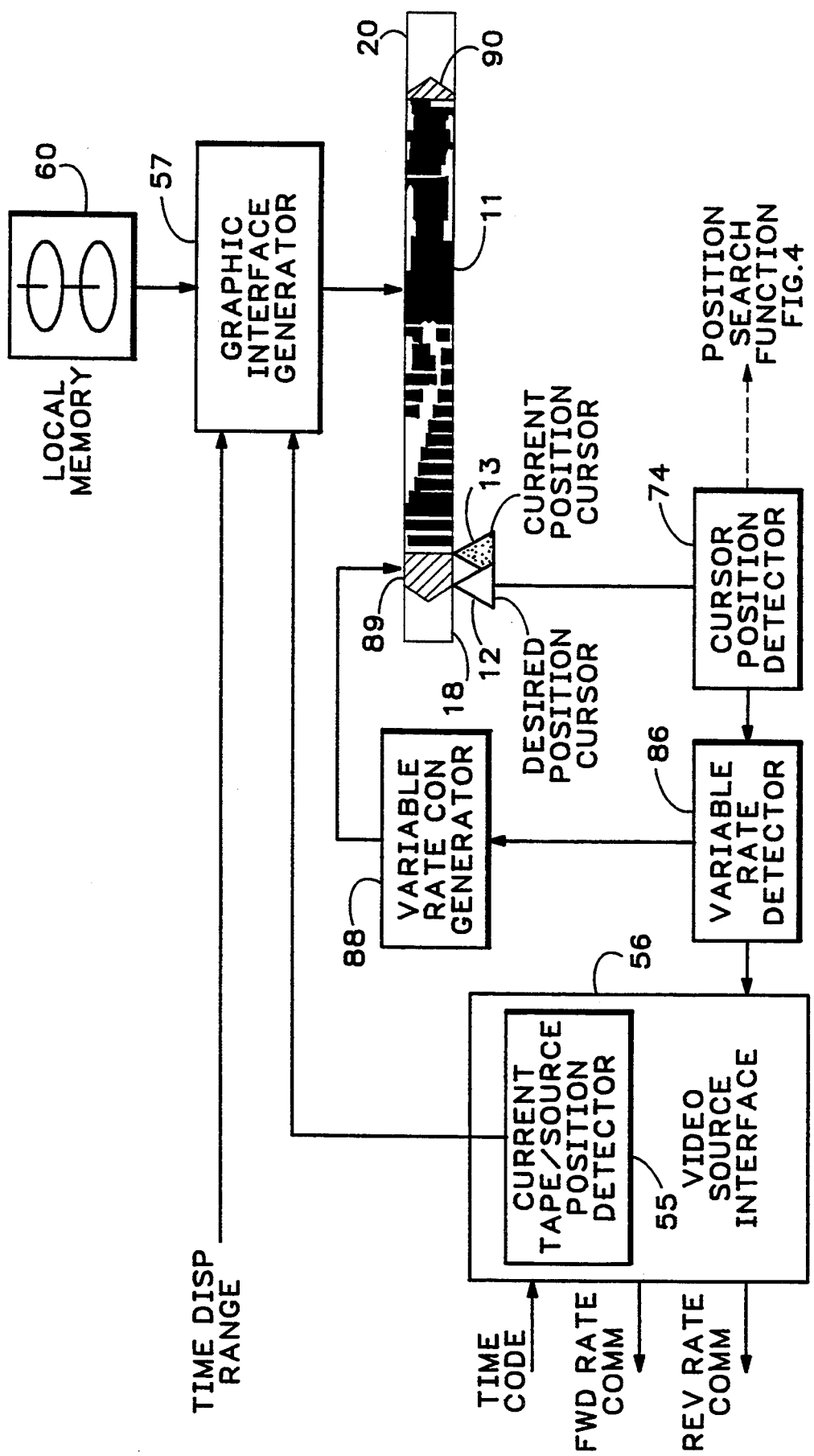
FIG. 5 is a block diagram representation of how a machine control window operates.

FIG. 5 is a block diagram representation that shows how the machine control window operates. A desired position cursor 12 is controlled using the mouse or other cursor control device (70 in FIG. 4) and the user's cursor generator (72 in FIG. 4). This cursor position is monitored by the cursor position detector 74. The output of the cursor position detector 74 is monitored by a variable rate detector 86. Based on whether the desired position cursor 12 is in the reverse motion area 18 or the forward motion area 20 and how far into one of those areas the desired position cursor is, the variable rate detector produces forward and reverse velocity control signals that inform the video source interface 56 and the variable rate icon generator 88 as to the user's desired velocity. The video source interface 56 in turn produces forward and reverse rate commands to control the actual mass storage medium tape or other source.

The variable rate icon generator 88 generates either a reverse variable rate icon 89 or a forward variable rate icon 90, depending on the direction and rate of desired motion. In the example shown in FIG. 5, the reverse variable rate icon 89 has grown larger toward the left to fill part of the reverse motion area 18 in proportion to the amount of the maximum available reverse velocity that is being used. In this example, the size of the reverse variable rate icon indicates that about 40% of the maximum available reverse velocity is being used. When forward motion is involved, the forward variable rate icon 90 operates in the same way, extending to the right to fill the forward motion area 20 in proportion to amount of the maximum available forward velocity that is being used.

As the current location along the active video sequence changes, the detailed video pictorial timeline 11 produced by the graphic interface generator 57 moves beneath the current position curser 13 to keep it positioned over the current location. To accomplish this, the graphic interface generator 57 needs information indicative of the current position and the timecode range, so that it can ascertain which frame samples (17 in FIG. 3) it must retrieve from the local memory 60 in order to produce the correct detailed video pictorial timeline 11. It receives the current tape/source position information from the current tape/source position detector 55 within the video source interface 56.

While the foregoing discussion concerning the operation of the desired position cursor 12 in the machine control window has referred to the motion of the cursor 12 into the forward and reverse motion areas 20 and 18, that motion need not actually occur. In one implementation, when the mouse 70 is moved in a way that would cause the cursor 12 position to go beyond the edge of detailed video pictorial timeline 11, the apparent position of the cursor 12 stops at that edge and yet the virtual motion of the cursor 12 can still be detected from additional real motion of the mouse 70.

Figure 6:
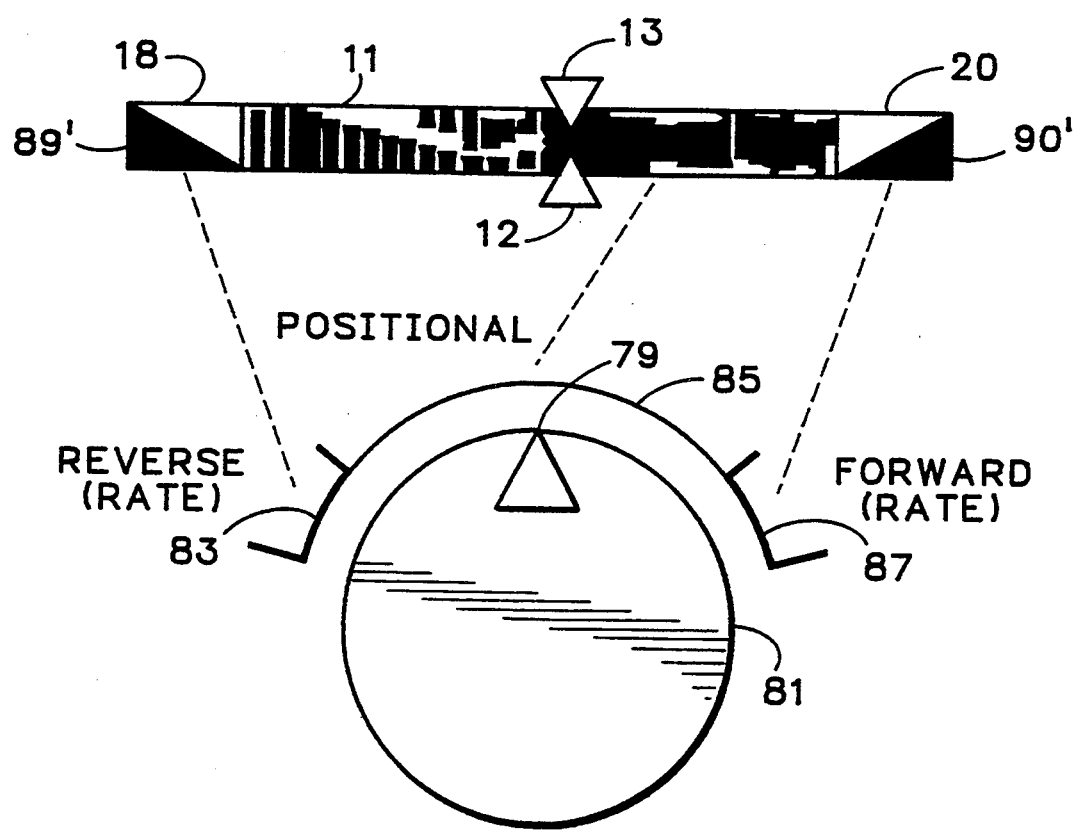
FIG. 6 illustrates an implementation of a machine control window utilizing a potentiometer instead of a mouse as the means for operator input.

FIG. 6 shows an alternative embodiment of the machine control window input mechanism. In this embodiment, the desired position cursor 12 is controlled by control knob 81 instead of a mouse or other cursor control device 70. As before, when the desired position cursor 12 is moved back and forth along the detailed video pictorial timeline 11, the current position cursor 13 follows and the frame selected is displayed in the video window (14 in FIG. 1). This motion of the desired position cursor 12 within the detailed video pictorial timeline 11 is controlled by the motion of the control knob 81 as active knob position indicator 79 moves through a positional region 85.

Sufficient counter-clockwise rotation of the control knob 81 takes the active knob position indicator 79 out of the positional region 85 and into a reverse region 83, while sufficient clockwise rotation of the active knob position indicator 79 takes the active knob position indicator 79 out of the positional region 85 and into a forward region 87. Maximum counter-clockwise rotation of the control knob 81 causes the desired position cursor 12 to move to the left end of the reverse motion area 18 and produces, as in the other embodiment, maximum reverse velocity of the VTR or other video storage device. Similarly, maximum clockwise rotation of the control knob 81 causes the desired position cursor 12 to move to the right end of the forward motion area 20 and produces maximum forward velocity along the video sequence.

The velocity of the video tape machine is proportional to the rotational distance of the active knob position indicator 79 into the forward or reverse regions 87 or 83, with maximum rotation corresponding to the maximum forward or reverse velocity of the video tape machine:

$$V_{cur} = \frac{D_{cur}}{D_{max}} * V_{max}$$

where, $V_{cur}$ is the current velocity,
$V_{max}$ is the maximum velocity,
$D_{cur}$ is the current distance into the region, and
$D_{max}$ is the maximum distance into the region.

The software of the human interface system can know the rotational position of the active knob position indicator 79 by any of several means. If the knob 81 employs a wire wound potentiometer, the output voltage indicating its position can be translated into a digital number by an analog-to-digital converter. Alternatively, the knob 81 can include an optical position encoder to provide a direct digital readout of its position. The logic required to interpret the digital knob position information is similar to that described for cursor position detection in connection with FIGS. 4 and 5.

Ideally, the locations on the knob 81 between the positional region 85 and the forward and reverse regions 83 and 87 are provided with detents to give the operator a slight amount of tactile feedback as the transition is made from positional operation to velocity controlling operation. The knob 81 also has stops at the outside ends of the reverse region 83 and forward region 87.

Another difference between the embodiment of the machine control window shown in FIG. 6 and the one shown in FIG. 5 is unrelated to the difference between using a control knob 81 rather than a mouse 70, and could be used with either embodiment. The reverse variable rate icon 89' and forward variable rate icon 90' in this implementation are both static, whereas the ones described above were dynamic. Whereas the icons described above changed size, extending dynamically to indicate various velocities, the ones shown here do not change, but nonetheless still suggest the idea of increasing velocity by their sloped shape and the motion of the desired position cursor 12 along that shape.

One more difference between FIG. 6 and FIG. 5 is that in the implementation shown in FIG. 6 the current position cursor 13 is disposed above the detailed video pictorial timeline 11, rather than below it, as it was in FIGS. 1, 4 and 5. In this implementation the current position cursor 13 remains visible even when it catches up with the desired position cursor 12, whereas in the other implementation, the two merge when they are aligned.

Figure 7B:
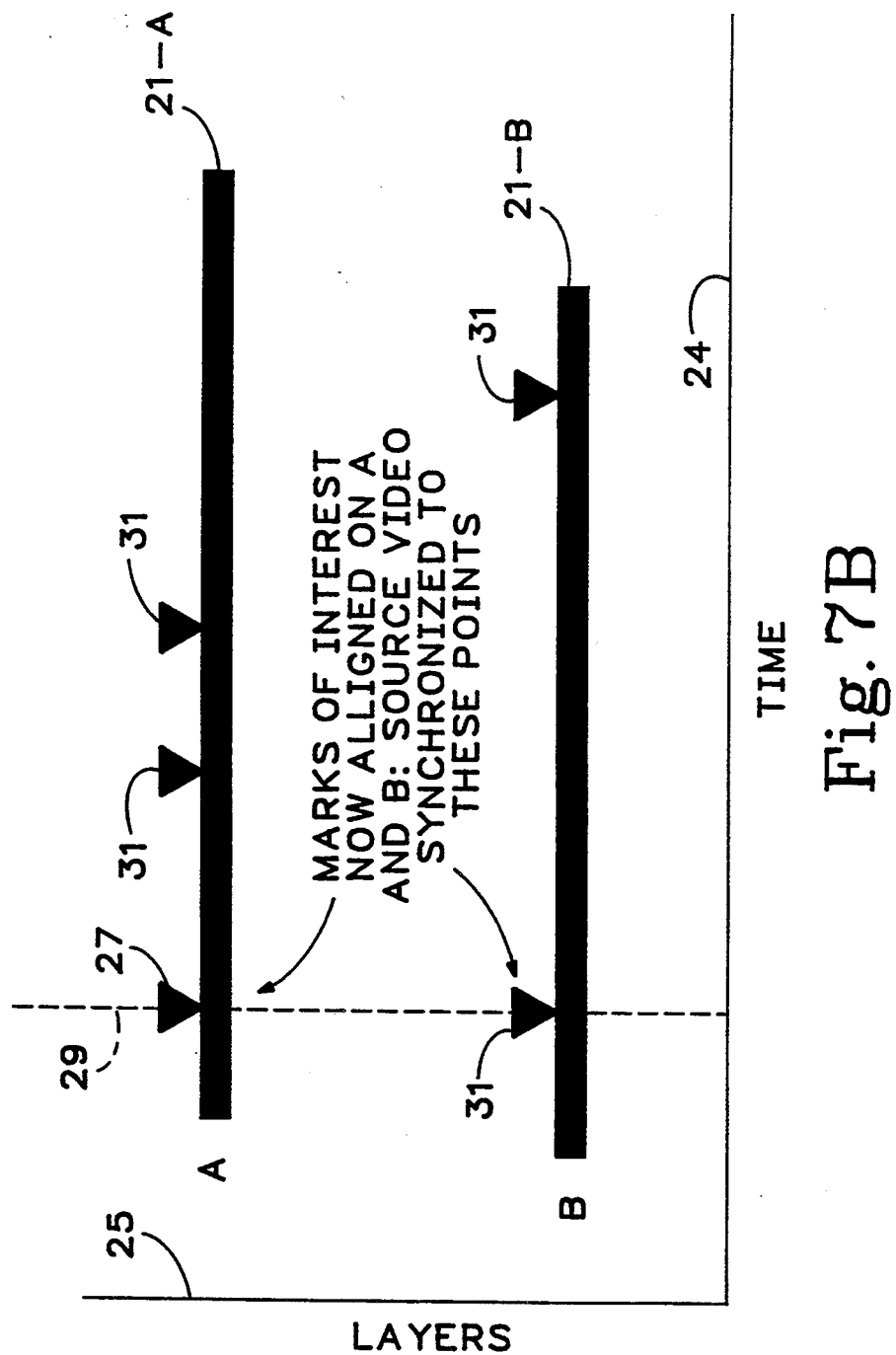

Referring now to FIGS. 7A and 7B, we see two simple timelines 21-A and 21-B extending horizontally along a time axis 24 and displaced vertically along a layers axis 25. The operator desires to time align a point of timeline 21-A with a point on timeline 21-B. Using a cursor 12 positioned on timeline 21-A near the location of what has now become the active time mark 27, the operator has previously pressed a control button or key to designate this particular time mark (which was formerly a "31") as the active time mark 27. When this designation was performed, a vertical reference line 29 parallel to the layers axis 25 appeared at the location of the active time mark 27. The operator then "dragged" the active timeline 21-A and the vertical reference line 29 to its present location using the mouse or other cursor control device while holding the control button down.

Since the reference line 29 now intersects timeline 21-B at a point which is closer to the time mark 31 on the left than it is to the one on the right or either end of the timeline 21-B, when the operator releases the control button on the mouse (70 in FIGS. 2 and 4), timeline 21-A moves to the left along the time axis 24 to automatically and exactly align the active time mark 27 on timeline 21-A and the nearest time mark 31 on timeline 21-B. Note that for the purpose of time alignment, both ends of the timelines 21 are also treated as if they were time marks 31.

In addition to aligning the timelines 21 and their time marks 27 and 31 on the screen, the software also makes note of the timecodes and offsets that will be required to access the under-lying video sources for recording or previewing in a time-aligned manner. The various means used by video editing systems for physically time-aligning video sequences, once the proper timecodes and offsets are known, is well known to those skilled in the video editing art.

Figure 8:
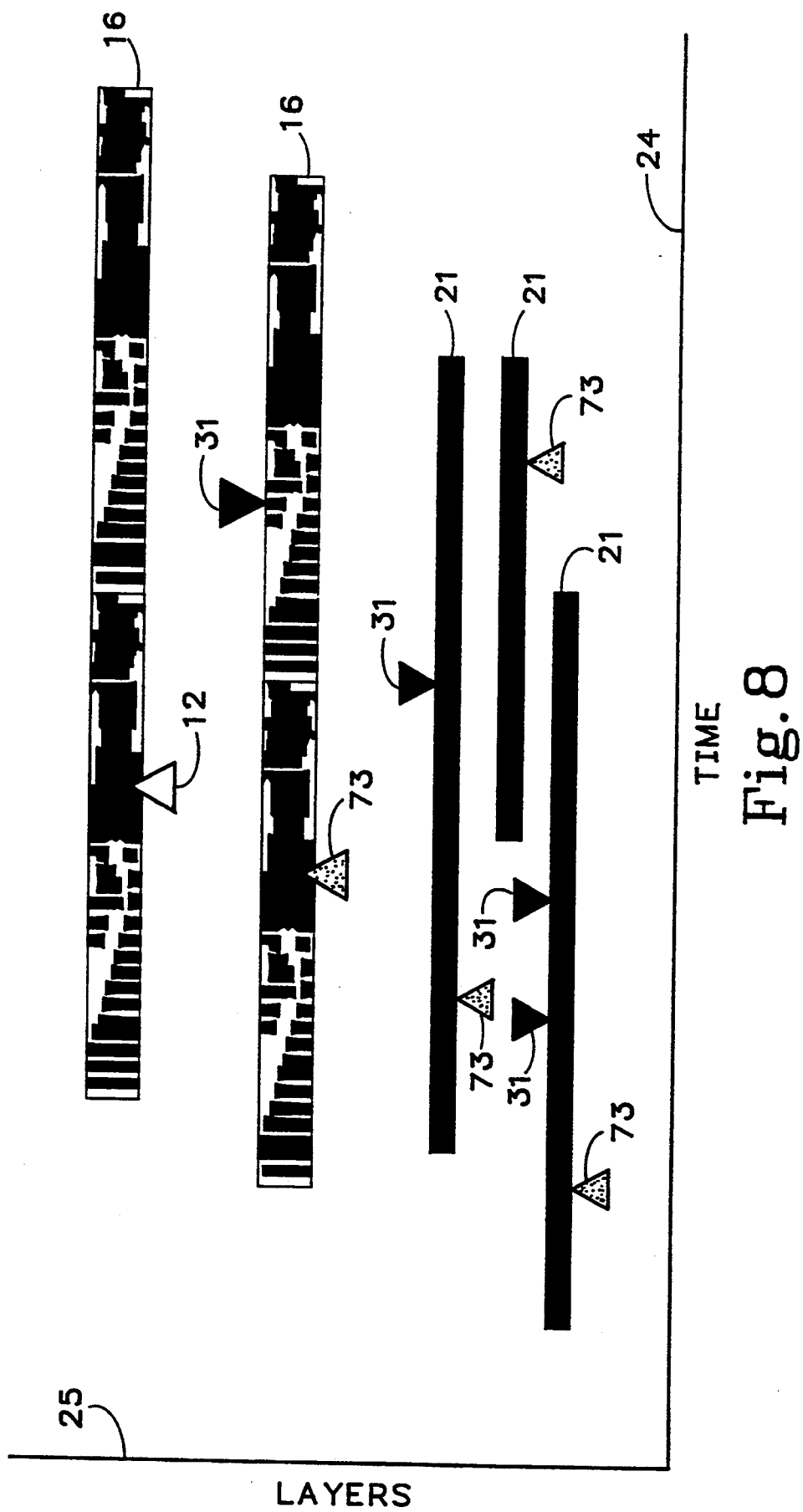
FIG. 8 is an illustration of three simple timelines and two video pictorial timelines in a single Workspace.

FIG. 8 shows how video pictorial timelines 16 can be used in conjunction with the simple timelines 21 in the same Workspace 15 area, such as the layers area 32. This allows some of the video sequences to be seen with the extra visual cues provided by the video pictorial timelines 16, while other video sequences are shown by the simple timelines 21 that save space and allow room for more layers of video to be displayed. FIG. 8 also shows several inactive current position cursors 73. These are left behind at the last position viewed, when the user's cursor 12 is detached from the current position cursor 13 by double clicking of the control button on the mouse 70.

Figure 9B:
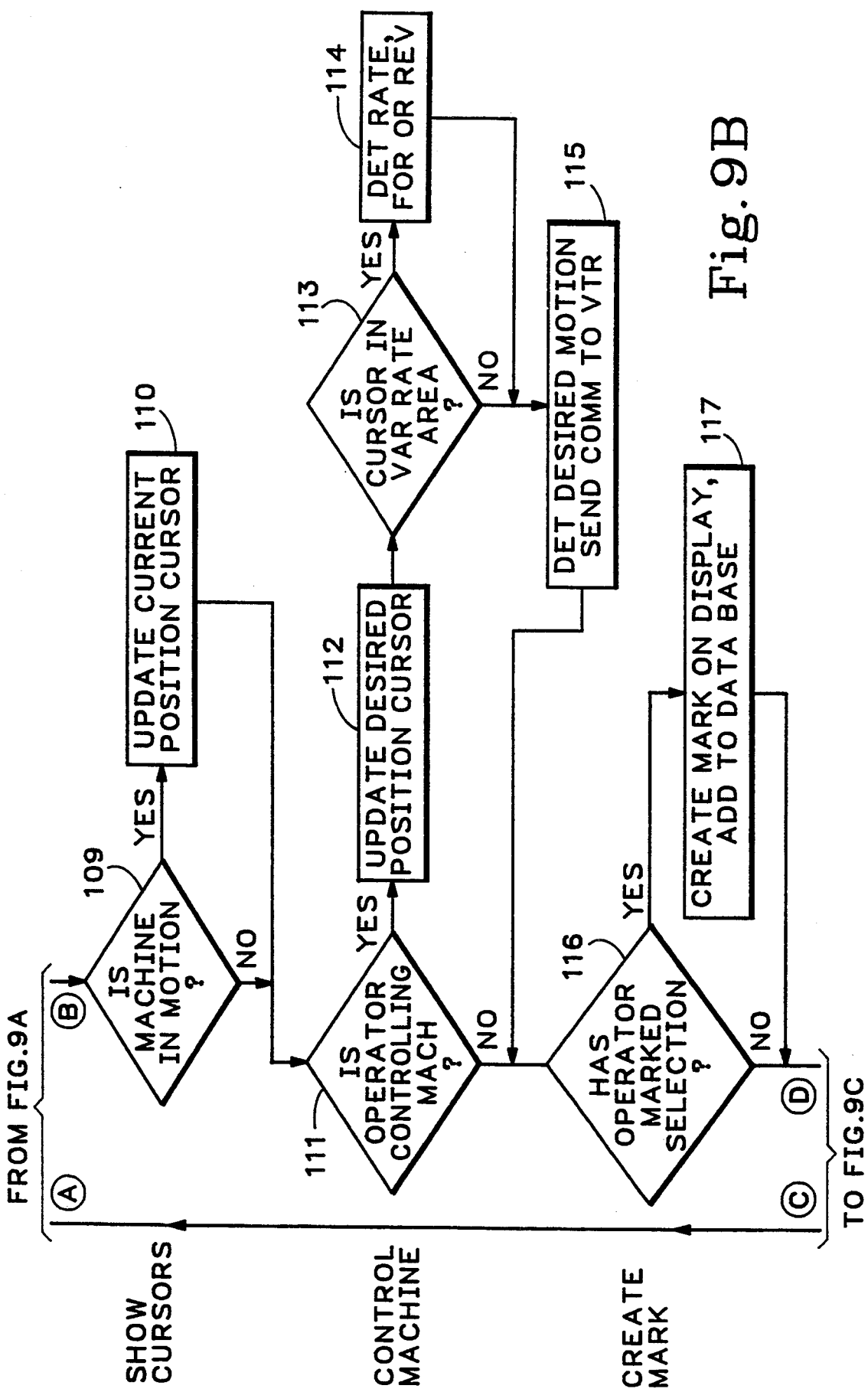
Figure 9D:
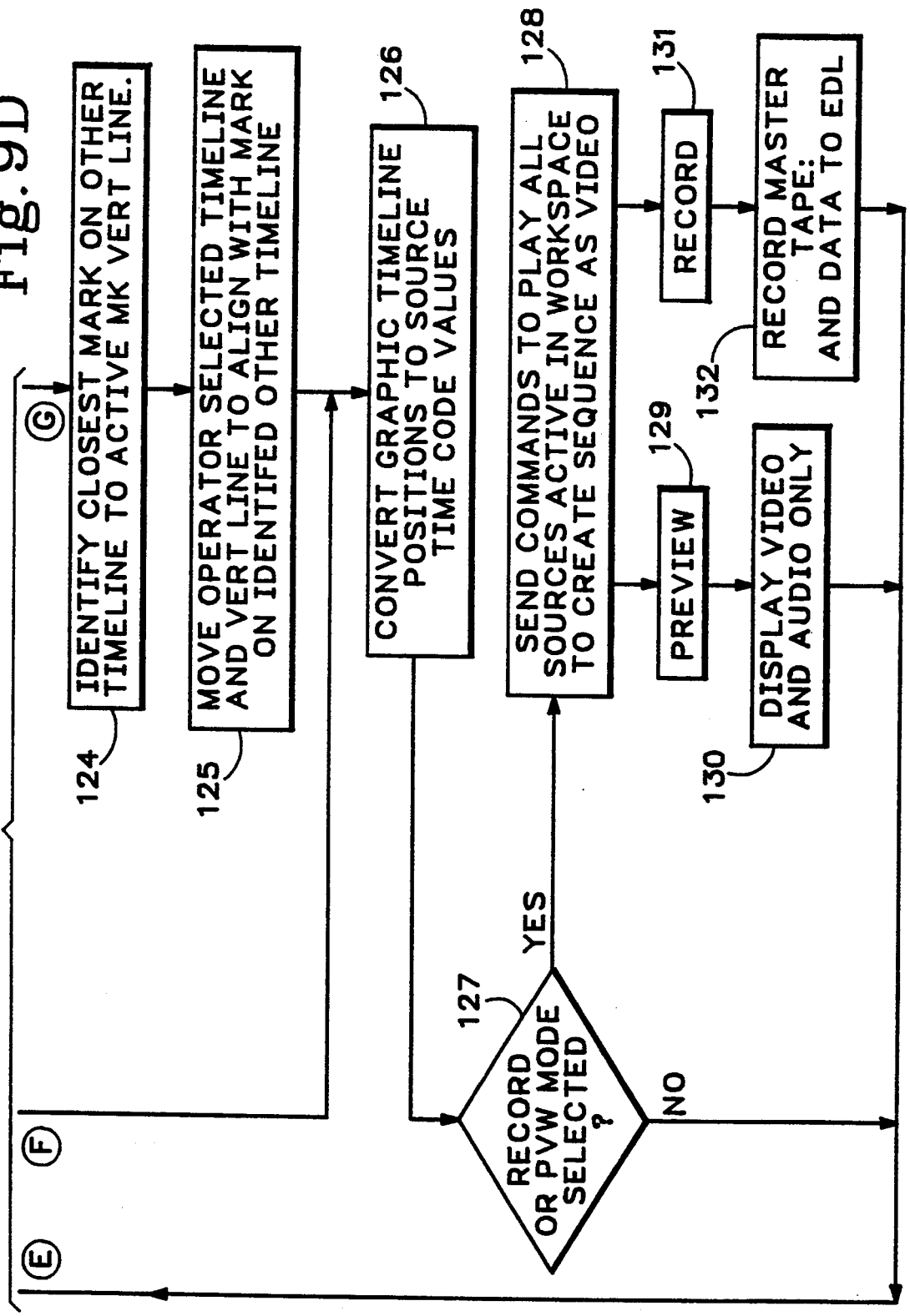

FIGS. 9A through 9D are a simplified logic flow diagram of a portion of the operator interface of the video editing system of the present invention. Referring first to FIG. 9A, at start up the screen, the graphics and the video window are initialized 100. The main loop of the program then waits 101 for a frame sync pulse. When the frame sync pulse is received, the graphics are refreshed and a new frame of video is written 102 in the video window. The status of the machine (video source) is then polled and the current position timecode is stored 103. Keyboard and menu commands are then processed 104 and it is determined whether a new source has been selected 105.

If a new source has been selected, 105-Yes, the new video is displayed 106 in the video window 14. A new main video pictorial timeline 10 and detailed video pictorial timeline 11 are created 107 and 108, as described in connection with FIG. 3.

Following these steps, as shown in FIG. 9B, a determination is made 109 as to whether or not the video tape machine or other video source is in motion. If no new source had been selected, 105-No, this determination 109 is made directly after the determination of step 105. If the machine is in motion, 109-Yes, the current position cursor is updated 110, as described in connection with FIG. 4, and then a determination is made as to whether or not the operator is controlling the machine 111. If the machine is not in motion, 109-No, the determination as to whether or not the operator is controlling the machine 111 is made directly, without updating the current position cursor 110.

If the operator is controlling the machine, 111-Yes, the desired position cursor is updated 112 and a determination is made 113 as to whether or not the desired position cursor is in one of the variable rate areas (forward motion area or reverse motion area). If the desired position cursor is in one of the variable rate areas, the desired forward rate of motion or reverse rate of motion is detected (86 in FIG. 5) and the detected rate of motion is converted to a command (56 in FIG. 5) to be sent 115 to the VTR or other mass storage device (50 in FIG. 2). If the cursor was not in the variable rate area, 113-No, the desired forward rate of motion or reverse rate of motion is detected (86 in FIG. 5) and the detected rate of motion is converted to a command (56 in FIG. 5) to be sent 115 to the VTR or other mass storage device (50 in FIG. 2).

After the command is sent 115 to the mass storage device, if path 111-Yes has been followed, or after it has been determined that the operator is not controlling the machine, 111-No, a determination is made 116 as to whether or not the operator has marked a selection to create a time mark, as described in connection with FIG. 4. If the operator has indicated a desire to create a time mark, 116-Yes, the mark is created 117 by the graphic interface generator 57 (FIG. 4) and placed in storage in the local memory 60 as described in connection with FIG. 4 above.

Whether or not the operator has marked a selection, 116-Yes or 116-No, as shown in FIG. 9C, a determination is made 118 as to whether or not the operator has identified a time mark as the active time mark (27 in FIG. 7A). If not, the graphic timeline positions are converted 126 (FIG. 9D) to timecode values. If the operator has designated a new active time mark, 118-Yes, a further determination 119 is made as to whether this is the first time through this loop since the operator identified the point. If this is the first pass through this loop, 119-Yes, the closest mark on the same timeline is identified 120, the active time mark is high-lighted 121 and a vertical reference line is created 121 through that mark. Following these 119-Yes activities, or without performing these tasks if this was not the first time through this loop, 119-No, operator input from the mouse is detected and responded to 122. This input, if it is present, is the desired horizontal motion of the timeline and the marks and vertical reference line associated with it. The response 122 is to move the timeline, marks and vertical reference line according to the operator input.

Next, it is determined whether or not the switch on the mouse is still active 123. If the mouse button is still depressed, 123-Yes, the program advances to decision block 127, shown in FIG. 9D. If the mouse button has been released, 123-No, a determination is made 124 as to which mark on another timeline is closest to the vertical reference line associated with the active mark on this timeline. The selected timeline and its marks and vertical reference line are then moved 125 to be aligned with the closest mark on the other timeline, as shown in the transition from FIG. 7A to FIG. 7B. This new position information for the selected timeline is then converted 126 to source timecode values.

The user interface is then polled to determine 127 if the operator has selected either "record" or "preview" actions. If the operator has selected neither, 127-No, the program returns to the top of the main loop (FIG. 9A) and waits for the next frame sync pulse 101. If either "record" or "preview" were selected, 127-Yes, then commands are sent 128 to play all of the sources that were active in the Workspace 15 at the times corresponding to their locations in the Workspace, thus creating the desired combined video sequence. If the selected operation is "preview" 129, the video and audio are displayed only 130. If the selected operation is "record" 131, the video and audio are recorded 132 to the master tape and the corresponding data is added to the edit decision list (EDL). In either event, the program returns to the top of the main loop and waits for the next frame sync pulse 101.

While a preferred embodiment of the present invention has been shown and described, it will be apparent to those skilled in the art that many changes and modifications may be made without departing from the invention in its broader aspects. For example, although the operator interface for a video editing system of the present invention, has been described as a single interface with several variations, portions of it could be modified for other uses and applied to those uses separately. The claims that follow are therefore intended to cover all such changes and modifications as fall within the true spirit and scope of the invention.

I claim:

1. A method for representing a video sequence, having a plurality of video frames, visually and spatially while minimizing local memory requirements, the method comprising the steps of:
    sampling each video frame of the video sequence to produce a frame sample for each video frame;
    storing the frame samples for the video frames in a local memory; and
    displaying the frame samples as a pictorial timeline representing an edge view of the video sequence.

2. A method according to claim 1, wherein frame samples are displayed side by side and the sampling step comprises the step of producing for each video frame a plurality of pixels that each represent an average video value within a corresponding region along a vertical axis of the video frame.

3. A method according to claim 2, wherein the producing step comprises the step of emphasizing a dramatic video feature within each region.

4. A method according to claim 1, wherein the sampling step comprises the step of selecting a plurality of pixels along a vertical axis of each video frame.

5. A method according to claim 4, wherein the vertical axis is taken through a center of each video frame.

6. A method according to claim 1 further comprising the steps of:
    storing a corresponding video sequence in a mass storage medium;
    providing with each frame sample a pointer to the video frame from which the frame sample is produced;
    selecting a location within the video sequence by indicating a frame sample from the pictorial timeline; and
    using the pointer from the indicated frame sample to access the video sequence at the selected location.

7. A method according to claim 6 further comprising the steps of:
    responding to operator instructions by rearranging an order in which the frame samples are displayed; and
    outputting an edited video sequence according to the operator rearranged order of frame samples using the pointers to the video frames.

8. A method according to claim 6 further comprising the step of providing a view into the stored video sequence.

9. A method according to claim 6 further comprising the steps of:
    sampling an audio signal to produce a plurality of audio samples which represent an envelope of the audio signal;
    storing the audio samples in the local memory; and
    displaying the audio samples together with the pictorial timeline as a visual representation of the envelope over time.

10. A method according to claim 9 further comprising the steps of:
    storing the audio signal in a mass storage medium;
    providing with each audio sample a pointer to a corresponding portion of the audio signal in the mass storage medium;
    responding to operator instructions by rearranging an order in which the audio samples are displayed; and
    outputting an edited audio sequence according to the operator rearranged order of audio samples using the pointers to the audio signals.

* * * * *